(Model.)

F. J. THOMAS.
Spring Calipers.

No. 239,072.  Patented March 22, 1881.

Witnesses:
James K. Walling
Elmer Cummings

Inventor:
Frederick J. Thomas
per Edw. M. Donn
Atty.

UNITED STATES PATENT OFFICE.

FREDERICK J. THOMAS, OF ATHOL, MASSACHUSETTS, ASSIGNOR TO C. F. RICHARDSON, OF SAME PLACE.

SPRING-CALIPERS.

SPECIFICATION forming part of Letters Patent No. 239,072, dated March 22, 1881.

Application filed January 7, 1881. (Model.)

*To all whom it may concern:*

Be it known that I, FREDK. J. THOMAS, of Athol, in the county of Worcester and Commonwealth of Massachusetts, have invented a new and useful Improvement in Spring Calipers and Compasses, of which the following is a full and true specification.

My invention relates to that class of calipers or compasses which open by force of the spring which unites the legs and forms the top of the tool, and particularly to the screw and nut by which the expansion of the legs is controlled.

In spring-calipers as usually made the screw by which the legs are adjusted to any desired opening is loosely fastened in one leg, and, passing through the other, has upon it a nut, usually with wings, and is called a "thumb-nut," which, screwed up or down, controls the movement of the legs as they are forced apart by the action of the spring. The movement of the legs under the action of the screw, whether contracting or expanding, is necessarily slow, and considerable time is spent when it becomes necessary to open or contract them to any considerable extent.

The accompanying drawings illustrate my invention, in which—

Figure 1:
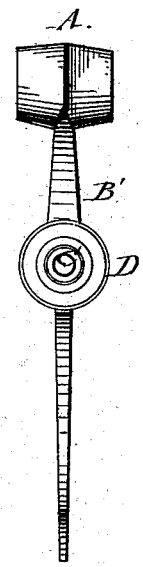
Figure 2:
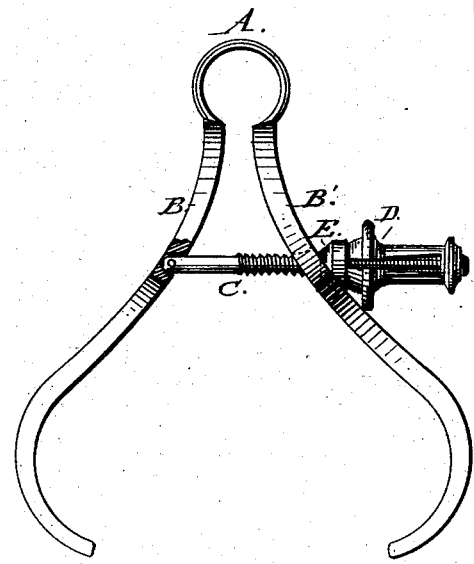
Figure 3:
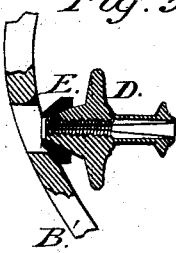

Figure 1 is an edge view of my device. Fig. 2 is a side elevation of same. Fig. 3 is a section through the nut and conical washer.

Similar reference-letters denote like parts in all of the figures.

My device is calculated to remedy the objection mentioned above, and, while holding the legs firmly in place, also allows the legs, by a movement, to be instantly expanded or contracted to their fullest extent.

My device consists in a nut made much longer than usual—say from half an inch to an inch and a half in length—and in size reduced to a ring at the upper end, which has no thread, and only serves as a guide and to hold the active parts of the nut below. The lower part, next the legs, in which the thread is cut, and which is the nut, is made conical to fit into a metallic cup or washer, E, which surrounds the screw C, and having the exact form to receive the end of the nut D, which draws closely into it, bears against the leg B' of the calipers as a washer, and as by the force of the spring A it is forced over the conical end of the split nut it inevitably draws the halves together to a bearing on the screw C. Above this conical end the nut is widened out to a breadth sufficient to give a hold to turn it by, and is provided with a burr around the edge to give a gripe for the thumb and finger. This nut is split longitudinally through its entire length to the ring around the upper end, which serves as the guide and to hold the two halves of the nut together.

The operation of it is this: The nut D being sawed open lengthwise, and being made of steel or some elastic metal, the two halves are sprung apart just enough so that they shall not engage in the thread of the screw unless compressed; but as soon as the pressure of the legs B B' bears upon the cup-shaped washer E it is forced over the conical end of the nut D, and immediately compresses the halves of the nut on the screw, making a complete nut and holding securely. The nut is also compressed by the gripe of the thumb and finger, and works up and down the screw as any other, the round nut with burr working much more conveniently than the ordinary thumb-nuts.

The special advantage consists in this, that when it is desired to open or close the calipers to any great extent by pressing the legs together with one hand the split nut, being open, slides the whole length of the screw unchecked unless closed by the thumb and finger, or the pressure of the released leg on the cup-shaped washer, unclosing the conical end of the nut. This saves much time and avoids frequent inconvenience in screwing the nut up or down.

What I claim for adjusting spring calipers or compasses is—

1. The nut D, to be used on the holding-screw of a pair of spring-calipers, said nut being hollow, screw-threaded, and split a portion of its length on two sides, as and for the purpose set forth.

2. The combination of the nut D, formed hollow, screw-threaded, and split a portion of its length on two sides, with the washer E, binding-screw C, and calipers B B' A, substantially as and for the purpose set forth.

FREDERICK J. THOMAS.

Witnesses:
F. H. GARMAN,
CHAS. W. BANNON.